INVENTOR
ROBERT W. ASTHEIMER

United States Patent Office 3,389,256
Patented June 18, 1968

3,389,256
THERMOMETER FOR MEASURING DISTANT TEMPERATURE DISCONTINUITIES IN GASES USING A FABRY-PEROT TYPE SPECTROMETER
Robert W. Astheimer, Westport, Conn., assignor to Barnes Engineering Company, Stamford, Conn., a corporation of Delaware
Continuation-in-part of application Ser. No. 364,151, May 1, 1964, which is a continuation-in-part of application Ser. No. 411,934, Nov. 17, 1964. This application Mar. 4, 1965, Ser. No. 440,352
14 Claims. (Cl. 250—83.3)

ABSTRACT OF THE DISCLOSURE

A thermometer for measuring temperature discontinuities is described using a Fabry-Perot type spectrometer and effecting spectral scanning by varying the spacing of the Fabry-Perot semitransparent mirrors or the angle at which radiation strikes them. Preferably an order selecting filter is used to select a higher order of interference fringes, for example the 7th order. Another modification drives the Fabry-Perot spectrometer with a sawtooth wave which may be modulated at a higher frequency.

Related applications

This application is in part a continuation of applications Ser. Nos. 364,151, filed May 1, 1964, and 411,934, filed Nov. 17, 1964, both now abandoned.

Background of the invention

A considerable problem has arisen by reason of what is known as "clear air turbulence." For high flying aircraft this a serious problem because there is no visual indication of turbulence as is the case with thunder storms and similar phenomena where the cloud forms give a pilot warning. Several fatal accidents with turboprop airplanes have been attributed to clear air turbulence which apparently broke off wings under conditions where there were no clouds. A particularly important instance is presented by the jet stream, at one edge of which there is high turbulence although the air is perfectly clear. High flying airplanes, of course, tend to use the jet stream when flying from west to east in order to save fuel, and it is, therefore, a serious problem to warn the pilot of the turbulent edge so that it can be avoided. Generally the best action to take when an area of turbulence is to be encountered is to slow up the speed of the plane. Sometimes it is possible to avoid the turbulent area, but often the area is too large or the warning time too short, or both. However, if the airplane is slowed up, there is usually no danger to the plane.

Summary of the invention

It has been found that clear air turbulence is associated with a rise in temperature, and the present invention is, therefore, concerned with an instrument for measuring temperature discontinuities sufficiently far ahead of the aircraft to provide the necessary warning of impending danger. The measurement may be ahead of the aircraft, preferably associated with a suitable computer, to permit reduction of airspeed or other corrective measures. It is also possible to measure the temperature to one side of the plane so that it can be flown to maintain a constant distance from the dangerous belt of turbulence where, as will often be the case in flying the jet stream, the direction of the line of turbulence is substantially along the line of flight or at a small angle thereto.

For measuring the temperature discontinuity, infrared radiation from carbon dioxide absorption bands is utilized. There are two bands in the atmosphere, one centering at $4.3\mu$ and the other in the vicinity of $13-15\mu$ and preferably $13-14\mu$. As the $13-15\mu$ band is near the radiation maximum for the temperatures encountered at high levels in the atmosphere, the energy available is greater, but it is possible to use the $4.3\mu$ band with detectors of suitable sensitivity.

It has been found that the distance to the line of thermal discontinuity is substantially proportional to the reciprocal of the carbon dioxide absorption coefficient at the wavelength of maximum radiation. Therefore, radiometers are used in which the region of the carbon dioxide absorption band, and preferably the band from $13-15\mu$, is spectrally scanned. The wavelength of maximum radiation is therefore a measurement of the distance to the thermal discontinuity.

Description of the preferred embodiments

Figure 1:
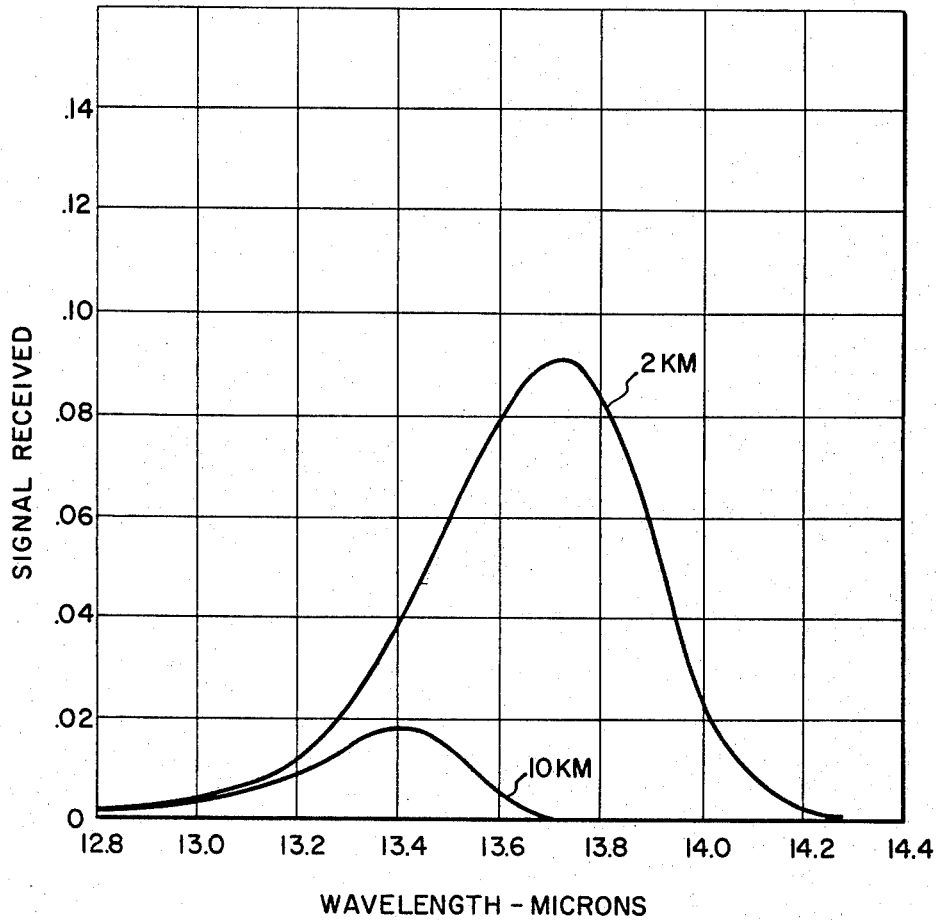
FIG. 1 is a series of curves of radiation response to a turbulent discontinuity at different distances.
Figure 2:
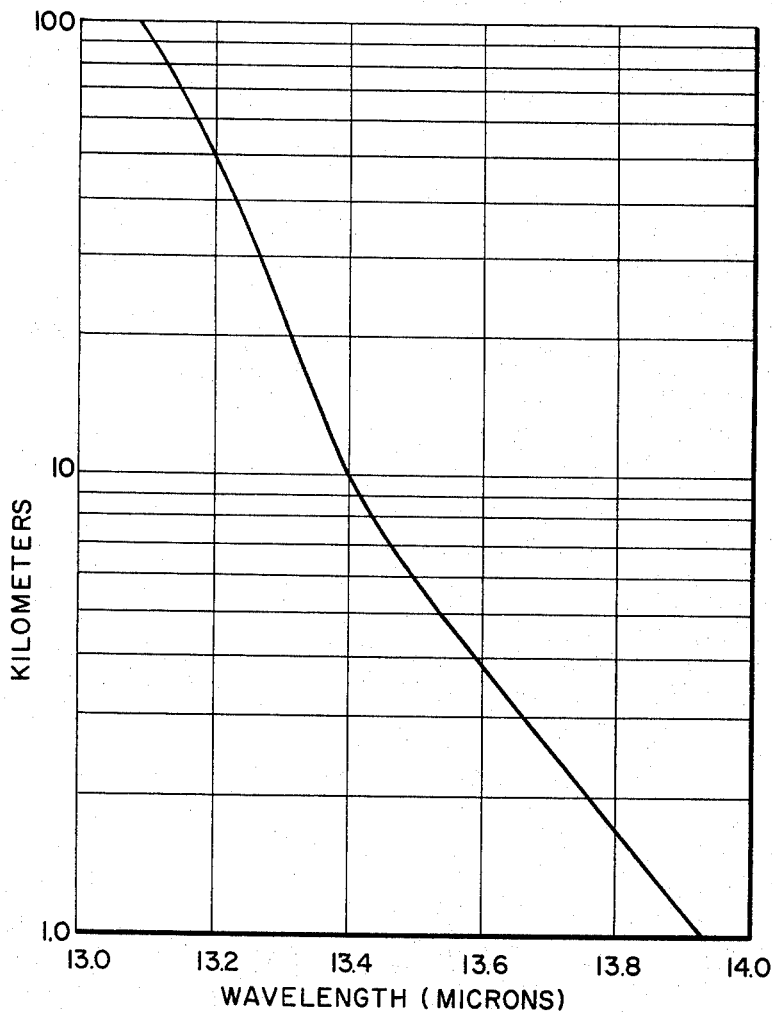
FIG. 2 is a graph of distance versus wavelength for distances up to about 100 km.
Figure 3:
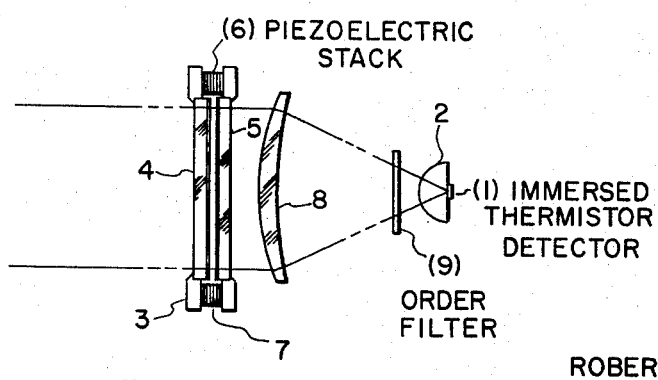
FIG. 3 is a section through an instrument for spectrally scanning the necessary wavelength interval.

Some limitations result from instrument sensitivity but, in the $13-15\mu$ band, with good immersed thermistor bolometers as illustrated in FIG. 3, a satisfactory signal-to-noise ratio of at least four is obtainable at 30,000 feet altitude at a distance of 10 km. with a turbulent band width of 0.5 km. and a temperature discontinuity of 1° C. With higher temperature differences and greater depth of the turbulent zone, greater distances can be measured. In general, distances will increase with higher altitudes and hence lower atmospheric pressure. It will appear from FIGS. 1 and 2 that 10 km. distance corresponds approximately to $13.4\mu$.

FIG. 3 shows an instrument of the present invention for spectral scanning. Essentially the instrument utilizes an immersed thermistor bolometer with a thermistor shown at 1 and a silicon or germanium immersion lens at 2. As illustrated the lens is a hemisphere but, of course, a hyperimmersed bolometer with the rear surface of the lens beyond the center of curvature of the front face may also be used. Spectral scanning is obtained by two semitransparent mirrors 4 and 5, the spacing of which is varied by means of stacks 6 and 7 of piezoelectric material, such as barium titanate, mounted in an annular clamp 3. An objective 8, which is of suitable infrared transmitting material, images the small field of view of the system onto the thermistor, and a filter 9 is provided to separate orders of interferences fringes resulting from the oscillation of the two plates which operate according to the principles of a Fabry-Perot interferometer. In order to obtain a scanning resolution of $0.1\mu$ the seventh order of interference fringes is used. This requires an average spacing of the reflecting plates of about $49\mu$. The plates are, of course, shown with an enormously exaggerated spacing in order to make the illustration clearer. To keep the voltage required on the piezoelectric stack to a reasonable figure, about 20 barium titanate elements are used, which permits utilizing an alternating voltage of about 600 volts peak to peak. The figures given are a typical illustration of the most desirable instrument construction but, of course, are illustrative only, and the spacing of the mirrors may be varied to give different resolution by employing a different order of interference fringes. The spacing which utilizes the seventh order constitutes a good practical compromise between adequate scan width and scanning accuracy. In the case of use in the 4.3µ band, the spacing should be appropriate for this wavelength.

Figure 4:
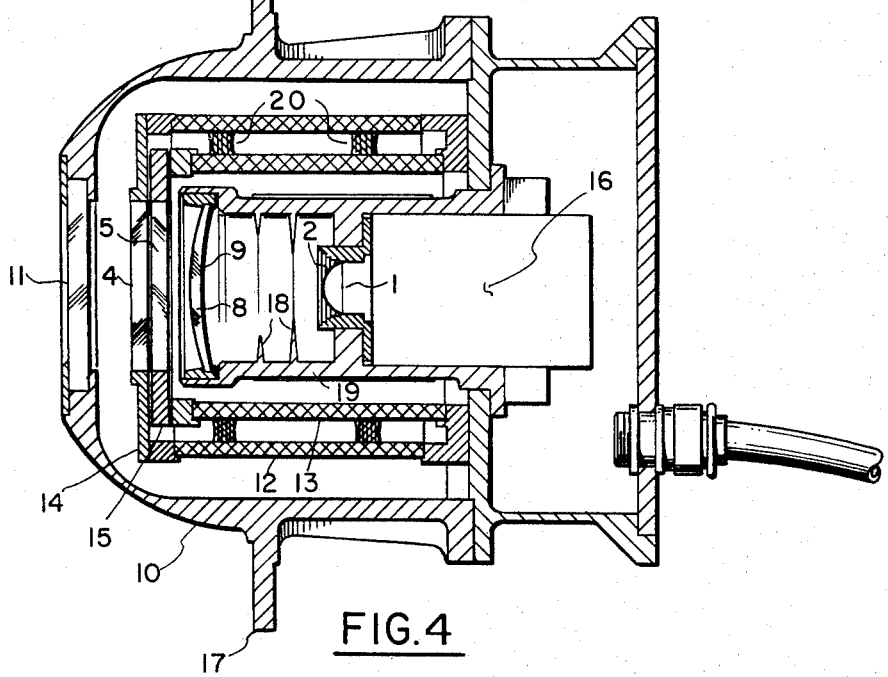
FIG. 4 is a section through an actual instrument, also illustrating temperature compensation.

FIG. 4 illustrates a practical instrument. It has the same elements as in the foregoing figures, which will be given the same reference numerals, except that a different form of piezoelectric drive is used and the order filter 9 is applied as a thin coating to the objective 8. The instrument is provided with a housing 10 having an Irtran-4 window 11 and a mounting flange 17. This housing permits maintaining an atmosphere under pressure. Instead of driving the Fabry-Perot plates 4 and 5 by stacks of barium titanate disks, the plates are mounted in rings 14 and 15, and the rings are moved by piezoelectric cylinders 12 and 13, which vibrate in the longitudinal mode. The inner and outer cylindrical surfaces are coated with an electrically conductive coating, in accordance with standard piezoelectric practice. In order to avoid confusion, these coatings are not shown. Also, the section is taken at a point which does not show the leads attached to the coatings. These leads are conventional, and the section has been chosen to avoid confusion of the drawings by showing the leads. A preamplifier 16 is also illustrated together with baffles 18 in a sleeve 19 which prevents stray light from reaching the detector, and serves as a mounting for the objective 8.

The piezoelectric drive, by means of two cylinders, oscillates the plates 4 and 5 in precisely the same manner as do the stacks in FIG. 3, but provides an additional feature. Since the cylinders are of the same length and of the same materials, their expansion with variations in instrument temperature will be the same, and as they are moving the Fabry-Perot plates in opposite directions, the gap between the plates is not changed by changing instrument temperatures. The operation of the instrument, of course, is exactly the same as in the one shown diagrammatically in FIG. 3, but provides the additional refinements of temperature compensation.

Different frequencies of alternating voltage may be used within the limits of the time constant of the thermistor detector.

If continuous scanning is to be used, the voltage will have a sawtooth waveshape. It is also possible to scan only at two wavelengths properly chosen. In this case the piezoelectric material is operated with a square wave of the proper voltage produced from a conventional square wave generator which is not shown.

An annular stack of piezoelectric material presents certain advantages of greater ruggedness but requires a very high accuracy in flatness of the mirror surfaces. It is also possible to use three stacks distributed uniformly, which presents somewhat less of a flatness problem in manufacture. In general, the exact shape of the piezoelectric driving stack is not the essential feature of the present invention, and any suitable distribution may be used.

Piezoelectric elements constitute the preferred embodiment of oscillating means for the two mirrors. Other oscillating means may, however, be used, such as magnetostrictive elements.

Figure 7:
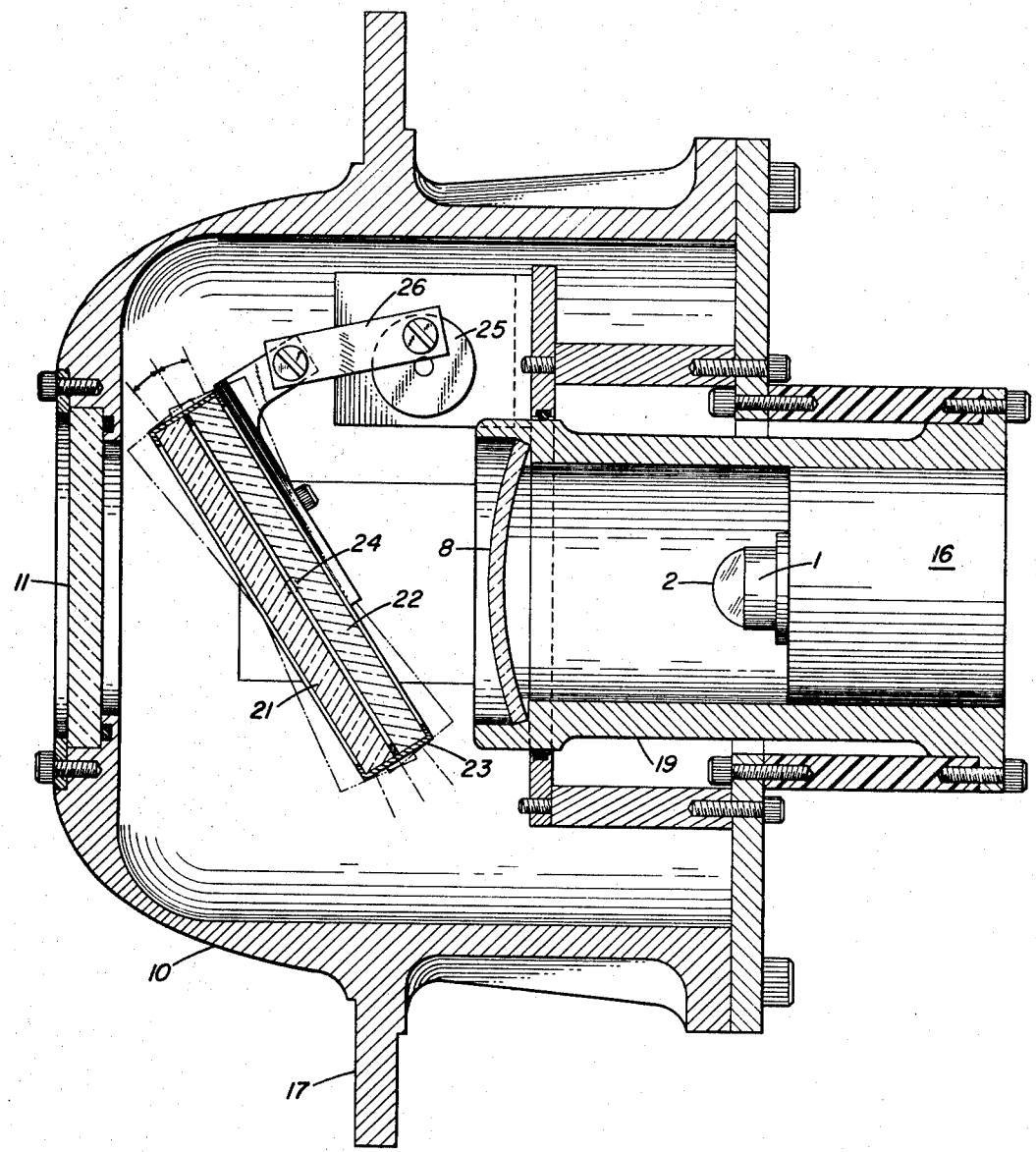
FIG. 7 is a section through a modified instrument.

The present invention includes in another aspect an improved scanning spectrometer without limitation to the nature of the radiation to be spectrally scanned, and so includes radiations in the visible and ultraviolet as well as the infrared which has been specifically described in conjunction with FIGS. 1–4. The only changes required by these different radiation ranges are that the detectors used must be sensitive to the particular band of radiations and that the normal spacing of the Fabry-Perot plates and the order selecting filter must correspond to the radiation required. Neither of these requirements involves any new features of design, as the detectors to be used are of standard types and the spacing of the Fabry-Perot plates obeys the standard equation: $n\lambda = 2d \cos \theta$, where $d$ is the gap between the Fabry-Perot plates and $\theta$ is the angle which the radiation makes with the optical axis of the instrument. It will be noted from the above equation that the wavelength orders are proportional to two quantities, the spacing of the Fabry-Perot plates and the angle at which radiation strikes them. In ordinary instruments using the Fabry-Perot principle the radiation strikes the plates substantially normally. In other words, in such a case $\cos \theta$ is unity and scanning is effected by varying the spacing $d$. This is the type of scanning illustrated in FIGS. 3 and 4. Scanning can, however, be effected by varying the angle $\theta$ while keeping $d$ constant, and this is illustrated in FIG. 7 which will be described below. It is, of course, theoretically possible to vary both $d$ and $\theta$ simultaneously, but because of the additional complexity this is normally not preferred in practical instruments, although quite operative.

In FIG. 7 the same elements will bear the same reference numerals as in FIG. 4. Instead of two movable Fabry-Perot plates receiving normal radiation, a pair of plates 21 and 22, fixed in a circular mount 23, are caused to oscillate about a central pin 24. The method of operation illustrated is by means of an eccentric plate 25 turned by a motor (not shown) which oscillates the plates 21 and 22 in a small arc by means of a linkage 26. Scanning results from a change in the angle of radiation $\theta$ and is effective for purposes of the present invention. Obviously, of course, the scanning is not a linear function as in the case of the other instruments which vary $d$. This, however, presents no problem.

Figure 5:
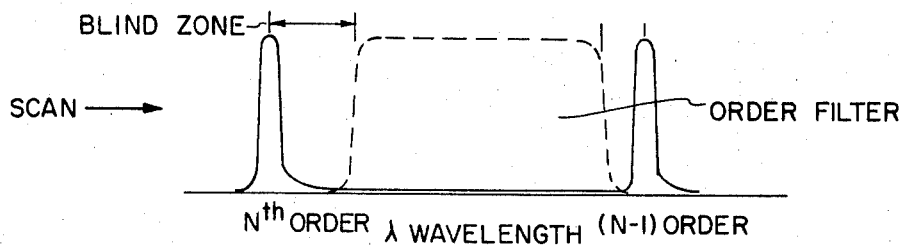
FIG. 5 is a curve showing signal response from an instrument having combined chopping and scanning functions.
Figure 6:
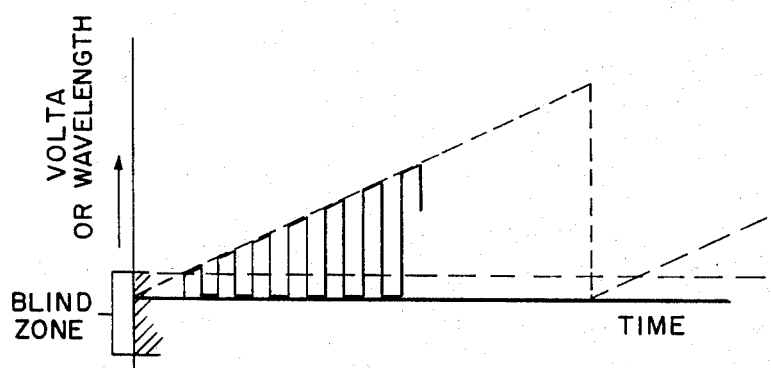
FIG. 6 is a graph of modulated driving voltage for an instrument performing the functions of FIG. 5.

The new scanning spectrophotometers of the above-mentioned aspect of the present invention depend on the wavelength band of the order selecting filter which must be less than the wavelength range between two adjacent interferometer fringes which, in the description of the graphs of FIGS. 5 and 6, will be generally referred to as $n$ and $n-1$. In the description of the instruments in FIGS. 3, 4, and 7, which was in connection with instruments for detecting temperature discontinuities in the atmosphere, the preferred choice was the 7th order. However, for the improved scanning spectrometers which may be used with other radiation sources, there is no such limitation as to preferred order and so the conventional, more general order designation is used.

The second difference is that for maximum efficiency a modulated sawtooth wave driving voltage is used for the transducers, in the preferred embodiment piezoelectric transducers, which are used to move the Fabry-Perot plates through the small distances required for spectral scanning. For example, the modulation may be 200 times the frequency of the scan. In a typical instrument where the scan may be 2 seconds, corresponding to a frequency of .5 cycle, the modulation may be 100 cycles. The reasons for preferring modulated sawtooth driving voltage will be described below after the principles of the new instrument have been set forth.

After the order selecting filter selects a narrower band than that between the wavelengths of the two orders chosen, there will be an area in the scan when no signal will pass because it encompasses wavelengths for which the order selecting filter cuts off. While the exact relations between the wavelength range of the order selecting filter and the two orders between which scanning takes place is not critical, it must be substantial, and, in practice, instruments can vary from 50–85% with 80% being a practical suitable choice. The reason for a significant width of the zone in the scan in which no signal is transmitted and which will be referred to as the "blind" zone is that order filters with cut-off edges so sharp that they are substantially vertical on a graph represent ideals which are not obtainable in practical filters. There is always a certain slope to the two edges and so if the blind zone is too small a percentage of the wavelength range between the orders chosen, the zone may not include a sufficiently complete cutoff for practical use. The term "substantially narrower" as applied to the order-selecting filter will be used in this practical sense. Theoretically, the blind zone could be very wide, in other words, an order selecting filter of extremely narrow band width might be used. However, in such cases spectral scan range of the instrument becomes very restricted. Therefore, it is desirable for these purely practical reasons to choose a blind zone dimension that is fairly narrow, for example, by using an order cutting filter that passes from 70° to 85° of the wavelengths between orders.

The operation of the instrument can now be generally described in conjunction with FIG. 5. There is shown a graph of the signal showing two orders, $n$ and $n-1$, with the order-selecting filter 9 chosen to transmit over approximately 80% of the range between the two orders. The instrument is initially calibrated by turning off the driving voltage for the transducers moving the plates, and adjusting the spacing of the plates manually with micrometric screws or other means which are common in Fabry-Perot spectrometers, until the spacing corresponds to an edge of the blind zone. Then when the scanning voltage is turned on, the spectrometer scans through a range approximately the separation of the two orders chosen, and produces a waveform with an initial substantially zero radiation signal corresponding to the blind zone. If the radiation is of uniform intensity over the scan, the shape of the output wave of the signal from the radiation detector will show a substantially zero line for the blind zone, and then will rapidly increase as the order selecting filter cuts on, remaining high until the wavelength is reached where the order-selecting filters cuts off. In other words, the signal is clamped to a low output which may be substantially zero for an interval corresponding to the blind zone width during each scan. This provides a recurring reference signal level which is of importance for many scanning spectrometer uses.

This also produces chopping of the radiation at scan frequency, the radiation being transmitted for a relatively longer period than the cutoff in the blind zone. This assures good energy utilization if the scan is fairly fast, and an accurate wave shape results if suitable demodulation is employed in the electronics which will be referred to later. However, the chopping frequency is quite low, and this imposes very severe limitations on the signal processing amplifiers, which must pass the very low frequency of the scan. Such amplifiers are heavy, costly, and particularly in the case of transistor amplifiers, very noisy, because of the extremely wide relative band width. For best results, therefore, it is desirable, though not essential to the principle of operation of the new scanning spectrometer, to modulate the sawtooth driving voltages of the transducers at a much higher frequency, for example 200 times the scan frequency. This is illustrated in FIG. 6 where for clearness the frequency of modulation is shown somewhat less than the practical desirable figures set out above. With a modulated drive voltage, amplifiers of simpler design and much lower noise are feasible, and so this modification is desirable for optimum results in practical instruments.

It will be noted that the same advantages of narrow chopping frequency band are obtained as can be obtained with A.C. bias on detectors which are of this type, as has been described above in conjunction with FIGS. 1–4. However, the noise problems and other factors involved in A.C. bias are not present, and so the same final result, as far as amplifier efficiency is concerned, is obtained with additional advantages. As compared to mechanical chopping, which, of course, may be used in any of the instruments described, the advantages of chopping are obtained with the elimination of additional mechanical elements.

No specific electronic processing circuits have been described, as conventional processing circuits for chopped radiation or A.C. biased detectors may be used. It is an advantage of the present invention that it does not require any new, unusual or complicated electronic circuits, and can employ well known and thoroughly conventional circuits. When the modulated sawtooth driving voltage modification shown in FIG. 6 is employed, there is an advantage in using a well known type of electronic processing circuit which employs synchronous demodulation. This permits a minimum band width and maximum detectivity because the noise is reduced to a very low level. Any standard form of synchronous demodulation, whether using mechanical, electromechanical, or purely electronic elements may be employed.

The present invention may be considered as ending when the signal is produced from the detector. The conventional circuits may terminate in a readout device such as a meter or an oscilloscope which will display traces similar to those in FIG. 1, or they may actuate a warning indicator. One modification of the present invention is directed to the instrument for spectrally scanning the temperature discontinuity and is, therefore, not concerned with the particular way in which the output signal is utilized.

An immersed thermistor bolometer is shown as the infrared radiation detector but, of course, other detectors may be used, such as thermopiles. Of course, the processing circuits have to match the impedance of the detector chosen, but this is conventional with infrared measuring instruments.

If it is desired to operate in the band near $4.3\mu$, cooled photodetectors may be used, which provides considerable additional sensitivity, which is desirable when operating in this band where the radiation is less intense than than in the preferred band at $13-15\mu$.

The transducers used to move the Fabry-Perot plates in FIGS. 3 and 4 have been illustrated as piezoelectric stacks. This form of transducer presents many advantages. It produces precise small movements with a very high frequency response and so constitutes the preferred form of transducer for moving the Fabry-Perot plates. However, any other form of transducer may be used which provides very accurate repetitive small displacements. An example of another type of transducer which has this needed characteristic is the standard magnetostrictive transducer.

I claim:
1. An instrument for spectrally scanning at least two wavelengths in the $13-15\mu$ carbon dioxide band, which comprises
   (a) a radiation detector responsive to the band,
   (b) means for imaging the field of view onto the detector,
   (c) said imaging means including a pair of semitransparent mirror plates spaced apart to produce interference fringes by multiple reflections,
   (d) means for oscillating the mirrors to effect a change in one of the two wavelength determining characteristics consisting of plate spacing and angle at which the radiation strikes the plates, and
   (e) the imaging means including also filter means for selecting a predetermined order of interference fringes.

2. An instrument according to claim 1 in which the means for oscillating the mirrors varies their spacing.

3. An instrument according to claim 2 in which the means for oscillating the mirrors comprises piezoelectric elements.

4. An instrument according to claim 1 in which the infrared detector is an immersed thermistor bolometer.

5. An instrument according to claim 3 in which the infrared detector is an immersed thermistor bolometer.

6. An instrument according to claim 1 in which the filter means selects the seventh order of interference fringes.

7. An instrument according to claim 3 in which the filter means selects the seventh order of interference fringes.

8. In a scanning Fabry-Perot spectrometer which includes a pair of Fabry-Perot semitransparent plates, electromechanical transducer means for moving the plates through a narrow range, said transducer producing movements of precisely repeatable extent whereby spectral scanning takes place with the production of multiple orders of interference fringes, the improvement which comprises,
 (a) electric driving means for the transducer imparting a sawtooth waveform thereon,
 (b) an order selecting filter having wavelength range substantially less than that between adjacent orders one of which is to be selected, whereby a substantial wavelength band in the scan is not transmitted, and
 (c) electronic processing circuits responsive to alternating input signals whereby combined scanning and clamping to a reference level is achieved simultaneously.

9. An instrument according to claim 8 in which the sawtooth transducer driving voltage is modulated at a much higher frequency than scan frequency and the zone between one end of the selected order and the cut-on of the order-selecting filter corresponds to a driving voltage produced by the modulation of the sawtooth wave whereby the instrument simultaneously scans and chops at a higher frequency.

10. An instrument according to claim 8 in which the transducer driving the Fabry-Perot plates is a piezoelectric transducer.

11. An instrument according to claim 9 in which the transducer driving the Fabry-Perot plates is a piezoelectric transducer.

12. In a scanning Fabry-Perot spectrometer which includes a pair of Fabry-Perot transparent plates, means for oscillating the plates through a small angle to vary the angle at which radiation entering the spectrometer strikes the plates, said oscillating means producing movements of precisely repeatable extent whereby spectral scanning takes place with the production of multiple orders of interference fringes, the improvement which comprises
 (a) electromechanical driving means for effecting oscillation, said driving means being fed by a sawtooth electric wave,
 (b) an order selecting filter having wavelength range substantially less than that between adjacent orders one of which is to be selected, whereby a substantial wavelength band in the scan is not transmitted, and
 (c) electronic processing circuits responsive to alternating input signals whereby combined scanning and clamping to a reference level is achieved simultaneously.

13. An instrument according to claim 8 provided with micrometric null adjustment of the Fabry-Perot plates to predetermined spacing and the lowest voltage of the sawtooth driving wave.

14. An instrument according to claim 9 provided with micrometric null adjustment of the Fabry-Perot plates to predetermined spacing and the lowest voltage of the sawtooth driving wave.

References Cited

UNITED STATES PATENTS

| | | | |
|---|---|---|---|
| 2,534,846 | 12/1950 | Ambrose et al. | 88—14 |
| 2,545,340 | 3/1951 | Bundy et al. | 88—14 |
| 3,103,586 | 9/1963 | Ovrebo et al. | 250—83.3 |

ARCHIE R. BORCHELT, *Primary Examiner.*